(12) United States Patent
Hwang et al.

(10) Patent No.: US 8,778,477 B2
(45) Date of Patent: Jul. 15, 2014

(54) VACUUM INSULATION MEMBER, REFRIGERATOR HAVING VACUUM INSULATION MEMBER, AND METHOD FOR FABRICATING VACUUM INSULATION MEMBER

(75) Inventors: Minkyu Hwang, Changwon-si (KR); Dongju Jung, Changwon-si (KR); Ilseob Yoon, Changwon-si (KR); Jinwoo Shim, Changwon-si (KR); Kyungdo Kim, Changwon-si (KR); Youngbae Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 165 days.

(21) Appl. No.: 13/386,744

(22) PCT Filed: Aug. 6, 2010

(86) PCT No.: PCT/KR2010/005177
§ 371 (c)(1),
(2), (4) Date: Jan. 24, 2012

(87) PCT Pub. No.: WO2011/016697
PCT Pub. Date: Feb. 10, 2011

(65) Prior Publication Data
US 2012/0125039 A1  May 24, 2012

(30) Foreign Application Priority Data

Aug. 7, 2009  (KR) .................. 10-2009-0072993

(51) Int. Cl.
*F16L 59/065* (2006.01)

(52) U.S. Cl.
USPC .............................. 428/69; 312/406

(58) Field of Classification Search
USPC .................. 428/69; 62/440; 312/406
See application file for complete search history.

(56) References Cited

U.S. PATENT DOCUMENTS 4,791,773 A * 12/1988 Taylor ...................... 52/786.13
6,828,001 B2 * 12/2004 Tokonabe et al. ............... 428/69

FOREIGN PATENT DOCUMENTS

| JP | 05-331924 A | 12/1993 |
| JP | 2002-243091 A | 8/2002 |
| JP | 2004-011705 A | 1/2004 |
| JP | 2006-002920 A | 1/2006 |

OTHER PUBLICATIONS

International Search Report and Written Opinion dated Mar. 21, 2011 issued in Application No. PCT/KR2010/005177.

* cited by examiner

*Primary Examiner* — Alexander Thomas
(74) *Attorney, Agent, or Firm* — Ked & Associates LLP (57) ABSTRACT

Disclosed are a vacuum insulation member, a refrigerator having a vacuum insulation member, and a method for fabricating a vacuum insulation member. The vacuum insulation member includes: an envelope having gas impermeability and having a certain decompressed space therein; and a core having a certain shape, having an empty space formed therein, and disposed at an inner side of the envelope to support the envelope. The use of a glass fiber core can be avoided, and thus, employing equipment for preprocessing the glass fiber core and time required therefor can be restrained and fabrication can be facilitated.

12 Claims, 6 Drawing Sheets

VACUUM INSULATION MEMBER, REFRIGERATOR HAVING VACUUM INSULATION MEMBER, AND METHOD FOR FABRICATING VACUUM INSULATION MEMBER

TECHNICAL FIELD

The present invention relates to a vacuum insulation member, a refrigerator having a vacuum insulation member, and a method for fabricating a vacuum insulation member, and more particularly, to a vacuum insulation member having a uniform insulation thickness, a refrigerator having a vacuum insulation member, and a method for fabricating a vacuum insulation member.

BACKGROUND ART

In general, a vacuum insulation member is a sort of insulator decompresses an internal space into a vacuum state to thus use the characteristics of low thermal conductivity of vacuum. The vacuum insulation member may be implemented in the form of a panel having a certain thickness.

The vacuum insulation panel may be configured to include an envelope forming a certain space therein and a core accommodated at an inner side of the envelope and supporting such that the envelope to maintain the certain space. In addition, a getter for absorbing an internal gas of the envelope may be provided at the inner side of the envelope.

The envelope (e.g., a film member), serving to maintain an internal vacuum degree of the vacuum insulation member at a certain level, is formed of a film formed by laminating multi-layered polymers and aluminum, or the like.

As the core, glass fiber, silica core, or the like, is used. Among them, glass fiber is commonly used because its excellent initial performance is excellent and its cost is low. However, glass fiber needs a preprocessing process and weak durability.

The getter is a sort of aspirator or an absorbent for absorbing gas and/or moisture which is present at the inner side of the envelope or newly introduced.

DISCLOSURE OF INVENTION

Technical Problem

In the related art vacuum insulation member, because the core is formed of glass fiber, it is not easy to handle the core, and in order to insert the core into the interior of the envelope, the core needs to undergo a preprocessing process (e.g., hot pressing or needle punching) in order to reduce the volume and size of the core. This results in problems in that the cost increases, much time is required, and the productivity is degraded.

Also, in the case of the vacuum insulation member using the glass fiber core, in a state that the interior of the envelope is vacuumized, the deviation of thickness of the vacuum insulation member is so large that the thickness of the vacuum insulation member is not uniform. Thus, in order to avoid such a problem, the overall thickness of an insulation wall is set and formed based on the portion of the vacuum insulation member which is the thinnest. This, however, causes a problem in that the thickness of the entire insulation wall increases overall.

In addition, in the case of the vacuum insulation member using the glass fiber core, after the vacuum insulation panel is fabricated, the surface of the envelope is creased to be non-uniform. Thus, when the vacuum insulation member using the glass fiber core is attached to an object, a foaming agent could be possibly introduced to the gap due to the creases of the envelope and expanded to cause the vacuum insulation member to be separated. Namely, the defective attachment (or defective bonding) is caused.

Solution to Problem

Therefore, in order to address the above matters, the various features described herein have been conceived.

An aspect of the present invention provides a vacuum insulation member capable of simplifying a preprocessing process of a core, a refrigerator having the vacuum insulation member, and a method for fabricating the vacuum insulation member.

Another aspect of the present invention provides a vacuum insulation member capable of obtaining a uniform insulation thickness, a refrigerator having the vacuum insulation member, and a method for fabricating the vacuum insulation member.

Another aspect of the present invention provides a vacuum insulation member capable of restraining a generation of creases on an outer surface and reducing a defective attachment, a refrigerator having the vacuum insulation member, and a method for fabricating the vacuum insulation member.

According to an aspect of the present invention, there is provided a vacuum insulation member including: an envelope having gas impermeability and having a certain decompressed space therein; and a core having a certain shape, having an empty space formed therein, and disposed at an inner side of the envelope to support the envelope.

Here, the core may be configured to include a body having a box-like shape with one side open, and a cover for opening and closing the opening of the body.

Ribs may be provided to be disposed in a thicknesswise direction at an inner side of the body.

The ribs may be disposed to be perpendicular to each other.

The ribs may be disposed to cross each other.

The core may be configured to include a plurality of bodies and a plurality of covers.

The vacuum insulation member may further include: a getter disposed at the inner side of the envelope for absorbing a gas.

A through portion may be formed on the core to restrain a heat transmission.

The through portion may be configured to include a slit having a length longer than its width.

The through portion may be formed such that certain regions overlap with each other with respect to a thicknesswise direction.

An internal vacuum degree of the envelope may range from $10^{-5}$ Torr to $10^{-2}$ Torr.

The envelope may be configured to include a film main body and a metal laminated film including a laminated layer formed by laminating metal on an outer surface of the film main body.

According to another aspect of the present invention, there is provided a refrigerator having the vacuum insulation member.

According to another aspect of the present invention, there is provided a method for fabricating a vacuum insulation member, including: forming an envelope having gas impermeability and a core having a certain shape, having an empty space formed therein, and disposed at an inner side of the envelope to support the envelope; coupling the envelope to an outer side of the core; and decompressing the interior of the envelope to make a certain vacuum degree maintained in the interior of the envelope.

Advantageous Effects of Invention

According to exemplary embodiments of the present invention, because the core having an empty space formed therein is disposed at the inner side of the envelope to support the envelope, the use of a glass fiber core which needs to under a pre-processing process, for which much equipment and time are required, can be avoided, and thus, the fabrication can be facilitated and the fabrication cost can be reduced.

In addition, because the core is configured to have the box-like shaped body and the cover, the completed vacuum insulation member can have a uniform thickness. Thus, the thickness of an insulation wall including the vacuum insulation member can be reduced.

In addition, because the core is configured to have the box-like shaped body and the cover, a generation of creases on the surface of the envelope after the interior of the envelope is decompressed (exhausted) can be considerably restrained. Thus, when the vacuum insulation member is attached to a surface of an object, a generation of a defective bonding that the vacuum insulation member is separated from the surface of the object resulting from its expansion according to an introduction of a foaming agent into a gap between creases of the envelope can be considerably reduced.

In addition, because the through portion is formed on the core, a heat transmission through the core can be restrained.

The foregoing and other objects, features, aspects and advantages of the present invention will become more apparent from the following detailed description of the present invention when taken in conjunction with the accompanying drawings.

BEST MODE FOR CARRYING OUT THE INVENTION

Exemplary embodiments of the present invention will now be described in detail with reference to the accompanying drawings.

Figure 1:
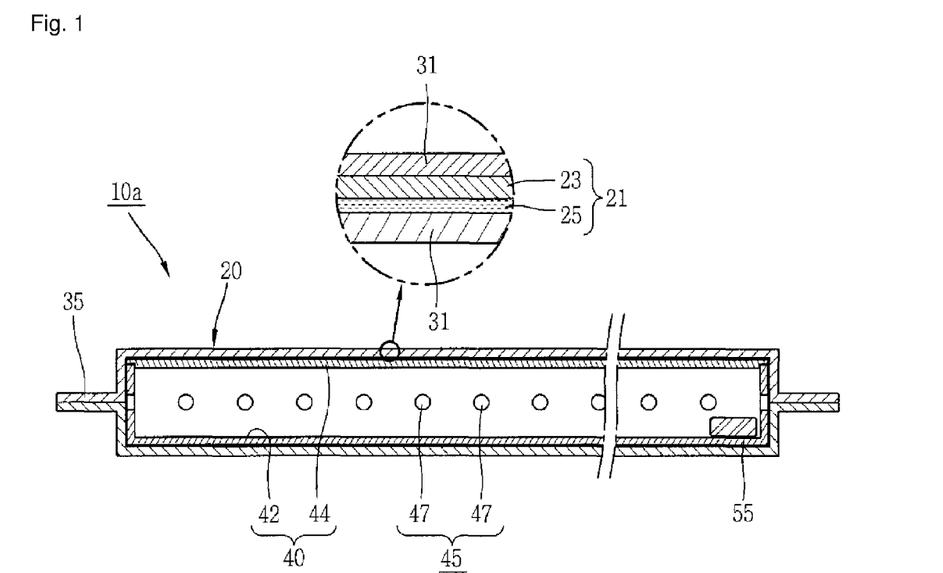
FIG. 1 is a sectional view showing a vacuum insulation member according to a first exemplary embodiment of the present invention.
Figure 2:
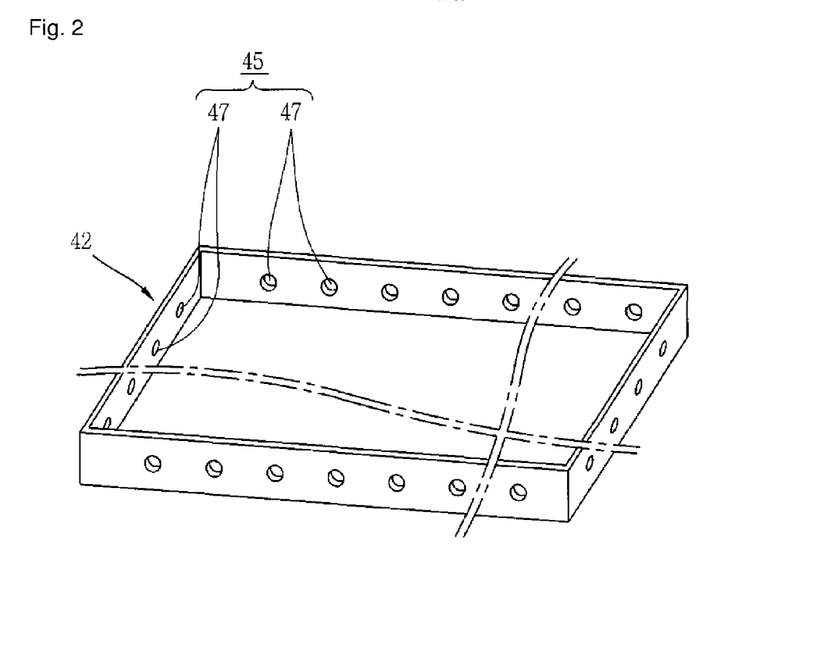
FIG. 2 is a perspective view of a body of FIG. 1.
Figure 3:
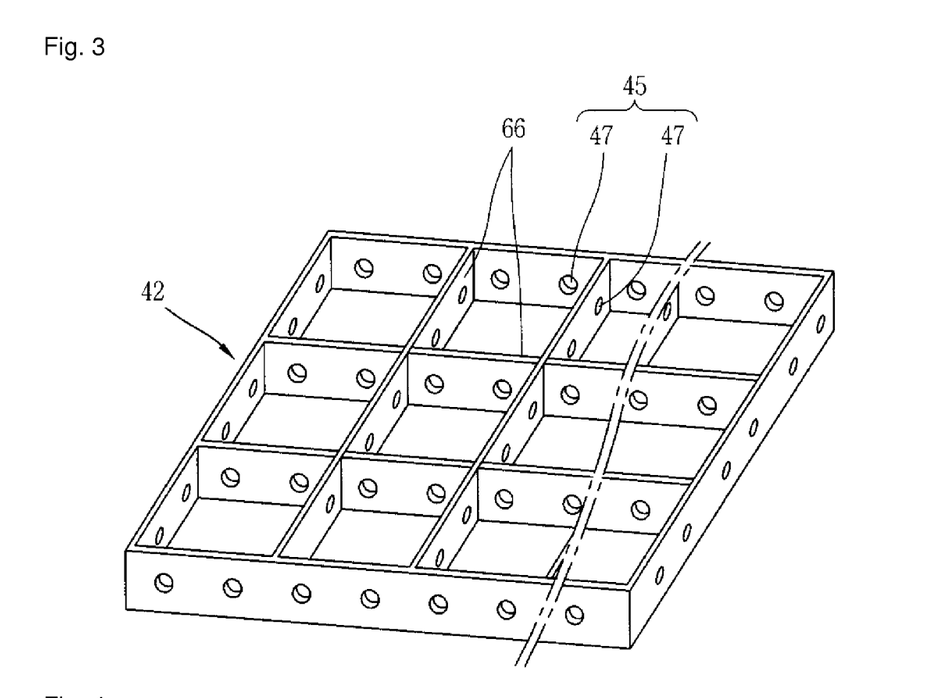
FIG. 3 is a variant of a core of FIG. 1.
Figure 4:
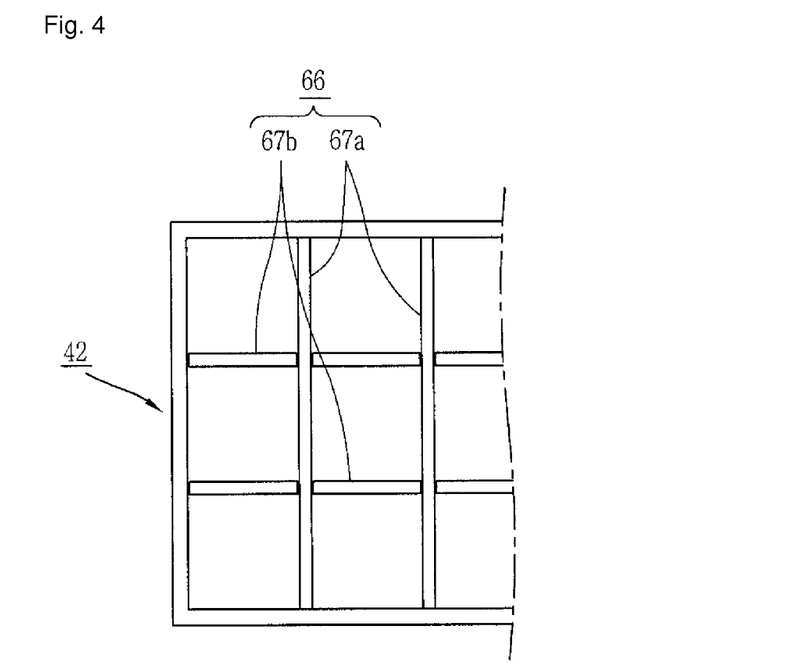
FIG. 4 is a partial plan view showing a variant of ribs of FIG. 3.
Figure 5:
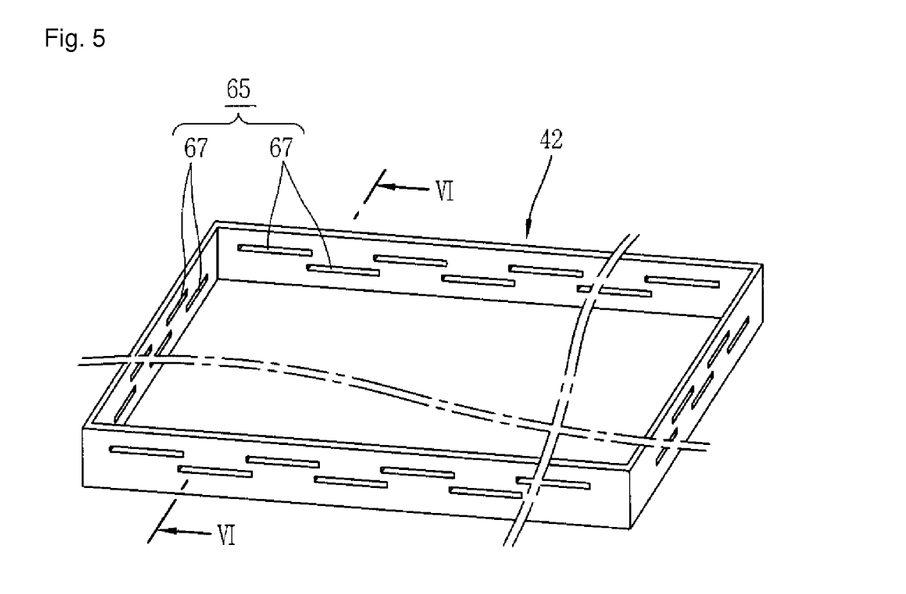
FIG. 5 is a variant of a through portion of FIG. 1.
Figure 6:
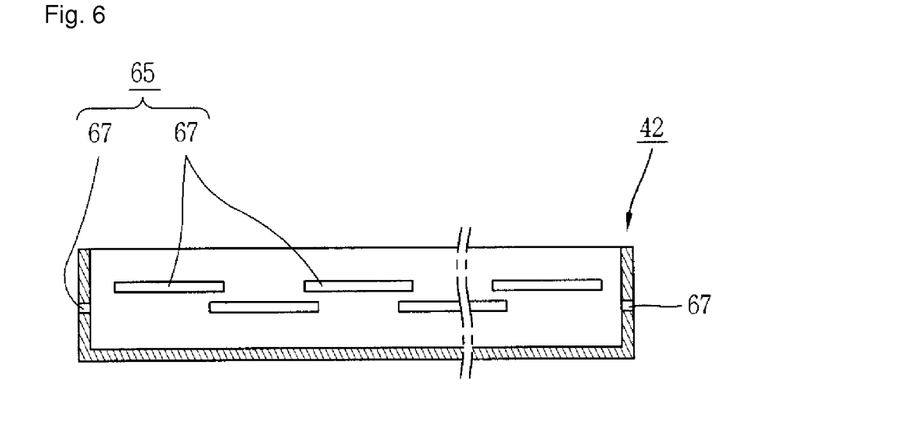
FIG. 6 is a sectional view taken along line VI-VI of FIG. 5.

FIG. 1 is sectional view showing a vacuum insulation member according to a first exemplary embodiment of the present invention, FIG. 2 is a perspective view of a body of FIG. 1, FIG. 3 is a variant of a core of FIG. 1, FIG. 4 is a partial plan view showing a variant of ribs of FIG. 3, FIG. 5 is a variant of a through portion of FIG. 1, and FIG. 6 is a sectional view taken along line VI-VI of FIG. 5.

As shown in FIG. 1, a vacuum insulation member 10a according to the present exemplary embodiment includes an envelope 20 having gas impermeability and having a certain decompressed space therein, and a core 40 having a certain shape, having an empty space formed therein, and disposed at an inner side of the envelope to support the envelope. Here, the decompressed space may be a space in which internal pressure is decompressed to be lower than atmospheric pressure.

The envelope 20 may be configured to have an anti-air permeability or gas impermeability in order to form a decompressed space having a certain vacuum degree therein. The envelope 20 may include a plurality of films 21 and 31 which are laminated to each other. A junction part 35 may be formed on at least one side of the envelope 20 by bonding the films 21 and 31 at upper and lower sides after the core 40 is accommodated.

An internal vacuum degree of the envelope 20 may be maintained at $10^{-4}$ Torr to $10^{-2}$ Torr. To this end, the envelope 20 may be configured to include a metal laminated film 21 formed by laminating a metal to have the gas impermeability (anti-air permeability). The metal laminated film 21 may be configured to include a film main body formed of a synthetic resin film and a laminated layer 25 formed by laminating a metal (e.g., aluminum (Al)) on the surface of the film main body 23.

The envelope 20 may further include resin films 31 disposed at an outer side and/or at an inner side of the metal laminated film 21. The resin films 31 may be made of polypropylene having excellent chemical resistance.

A getter 55 may be provided at the inner side of the envelope 20 in order to absorb a gas remaining at the inner side of the envelope 20 or a gas introduced into the interior of the envelope 20 from an outside. The getter 55 may be configured to include at least one of BaLi, CoO, BaO, and CaO in order to absorb oxygen, hydrogen, nitrogen, carbon dioxide, and vapor. Here, the getter 55 may be configured to have the shape of a certain block or a rectangular parallelepiped. Also, the getter 55 may be coated on an inner surface of the envelope or the surface of the core 20.

The core 40 for supporting the envelope 20 may be provided at the inner side of the envelope 20 in order to form and support a decompressed space having a certain vacuum degree.

The core 40 may be configured to have the shape of a rectangular parallelepiped with an empty space formed therein. Accordingly, the use of glass fiber core can be avoided, and thus, a preprocessing process (e.g., hot pressing or needle punching, and the like), for which much equipment and much time are required, is not necessarily performed to reduce the size and volume of the glass fiber core resulting from the use of the glass fiber core.

In addition, because the deviation of the height (thickness) of the core 20 can be reduced, after the internal space of the envelope 20 is decompressed (vacuumized), a uniform insulation thickness of the vacuum insulation member 10a can be obtained. Namely, when the related art glass fiber core is used, after the internal space of the envelope 20 is decompressed (vacuumized), the thickness of the vacuum insulation member is greatly changed (about 30 percent), while there is little change in the thickness of the vacuum insulation member 10a according to the present exemplary embodiment, obtaining the uniform thickness.

In addition, because the envelope 20 is supported by the core 40 having the shape of a rectangular parallelepiped, after the interior of the envelope 20 is vacuumized, a generation of creases on the surface of the envelope 20 can be restrained. Accordingly, when the vacuum insulation member 10a is attached to an object (e.g., a wall surface of the main body of a refrigerator), a generation of a defective bonding that the vacuum insulation member 10a is detached from the object due to the creases of the envelope 20 can be prevented.

As shown in FIGS. 1 and 2, the core 40 may be configured to including a body 42 having a box-like shape (i.e., a rectangular container shape) with one side open and a cover 44 for opening and closing the opening of the body 42. The core 40, specifically, the body 42 and the cover 44 may be made of a synthetic resin material. The body 42 and the cover 44 may be formed through injection molding. Here, the thickness of the body 42 and the cover 44 may range from 0.5 mm to 5 mm. However, the thickness is merely illustrative, and the thickness of the body 42 and the cover 44 may be appropriately adjusted in consideration of the thickness and the internal vacuum degree of the vacuum insulation member. The height of the core 40 may range from 5 mm to 15 mm such that it corresponds to the thickness of the vacuum insulation member.

A through portion may be formed on the core 40 in order to restrain a heat transmission. In detail, the through portion may be formed on a side wall of the body 42 in order to restrain a heat transmission in a thicknesswise (heightwise) direction. The through portion may be configured to include a plurality of circular holes. The through portion may be formed to have a polygonal shape, an oval shape, and the like.

Here, the size, shape, and number of the through portions may be appropriately adjusted in consideration of a support strength and an internal vacuum degree.

Meanwhile, as shown in FIG. 3, the core 40 may be configured to include the body 42 having a box-like shape with one side open, the cover 44 for opening and closing the opening of the body 42, and ribs 66 disposed at the inner side of the body 42.

The ribs 66 may be disposed along the thicknesswise direction of the core 40. In detail, the ribs 66 may be configured such that one side (i.e., lower end) thereof is in contact with a lower surface of the body 42 and the other side (i.e., upper end) is in contact with the cover 44.

The ribs 66 may be formed to cross each other. Accordingly, the internal space of the body 42 may be uniformly demarcated to obtain a uniform support strength. The body 42 and the ribs 66 may include through portions.

As shown in FIG. 4, the ribs 66 may be disposed to be perpendicular to each other at the inner side of the body 42. The ribs 66 may include a plurality of first ribs 67a disposed to be parallel to each other at the inner side of the body 42 and a plurality of second ribs 67b disposed at a right angle with respect to the first ribs 67a.

In FIGS. 3 and 4, the ribs 66, 67a, 67b may be integrally formed with the body 42, or may be configured to be received and disposed at the inner side of the body 42, separately from the body 42.

As shown in FIGS. 5 and 6, through portions 65 may be configured to have a plurality of slits 67 having a length which is long.

The slits 67 may be disposed to be perpendicular to the thickness (height) of the core 40. Accordingly, a heat transmission in the thicknesswise direction of the core 40 can be restrained. The plurality of slits 67 may be formed at each side wall of the core 40. The slits 67 may be formed such that certain regions thereof overlaps with each other in the thicknesswise direction of the core 40. Accordingly, a heat transmission in the thicknesswise direction of the core can be more effectively restrained.

In more detail, the plurality of slits 67 are formed to be spaced apart in a row in a horizontal direction at one side wall of the core 40, and lower slits 67 may be formed in a row such that both end portions thereof overlap with the upper slits 67 at a lower side of the slits 67. Here, the length, width, and number of the slits 67 may be appropriately adjusted.

With such a configuration, when the envelope 20 and the core 40 are formed, the getter 55 is inserted into the interior of the core 40. And then, the envelope 20 is coupled to the exterior of the core 40, the interior of the envelope 20 is decompressed to maintain a certain vacuum degree, and then the envelop 20 is hermetically sealed.

Figure 7:
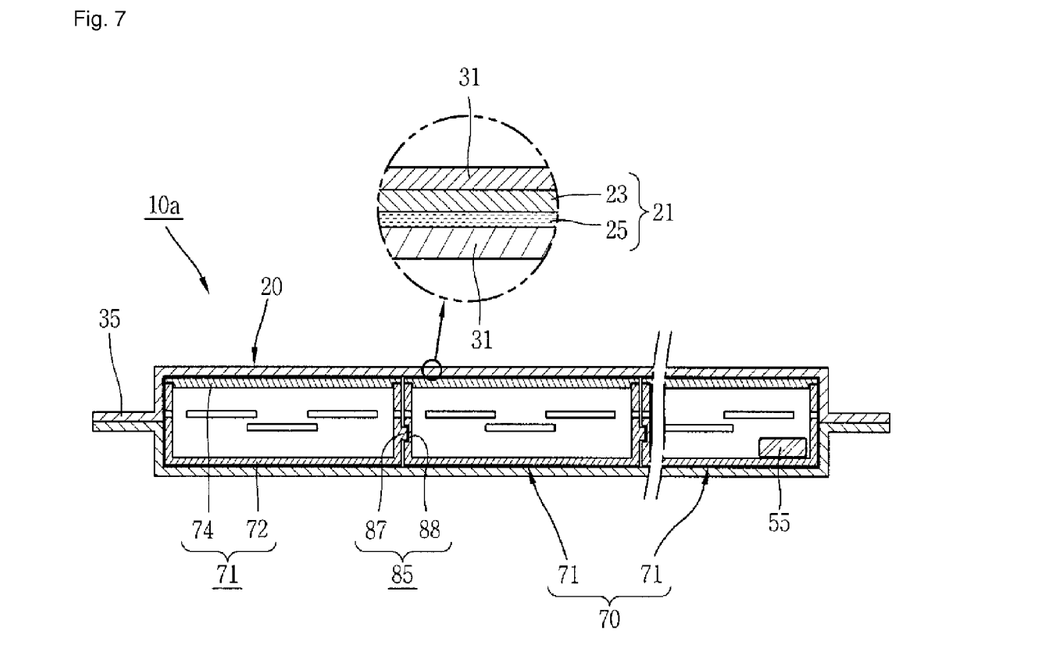
FIG. 7 is a sectional view of a vacuum insulation member according to a second exemplary embodiment of the present invention.
Figure 8:
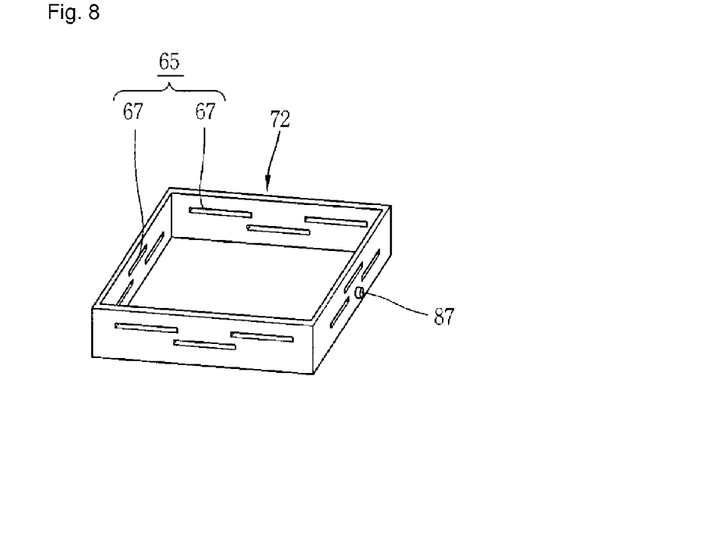
FIG. 8 is a perspective view of a body of FIG. 7.
Figure 9:
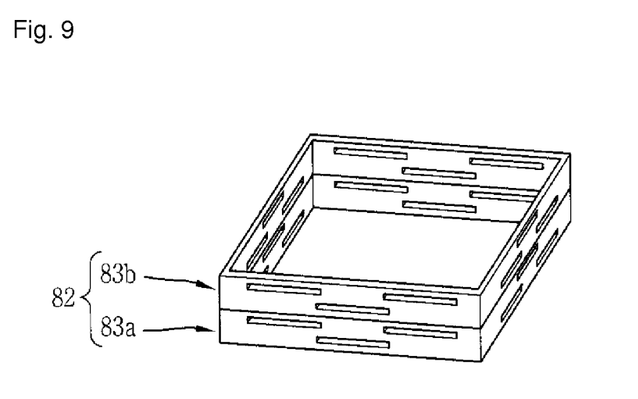
FIG. 9 is a variant of the body of FIGS. 7.

FIG. 7 is a sectional view of a vacuum insulation member according to a second exemplary embodiment of the present invention, FIG. 8 is a perspective view of a body of FIG. 7, and FIG. 9 is a variant of the body of FIG. 7.

The same reference numerals are used for the same and equivalent parts of the foregoing configurations for the sake of explanation of the drawings, and a repeated description of some elements will be omitted.

As shown in FIG. 7, a vacuum insulation member 10b according to the present exemplary embodiment includes the envelope 20 having gas impermeability and having a certain decompressed space therein, and a core 70 having a certain shape, having an empty space formed therein, and disposed at an inner side of the envelope to support the envelope. Here, the decompressed space may be a space in which internal pressure is decompressed to be lower than atmospheric pressure.

The envelope 20 may be configured to have an anti-air permeability or gas impermeability in order to form a decompressed space having a certain vacuum degree ($10^{-5}$ Torr to $10^{-2}$ Torr) therein.

To this end, the envelope 20 may include a metal laminated film 21 including a laminated layer 25 formed by laminating a metal (e.g., aluminum) on a surface of a film main body 23 made of a synthetic resin.

A junction part 35 may be formed on at least one side of the envelope 20 by bonding the films at upper and lower sides after the core 70 is accommodated.

The envelope 20 may further include resin films 31 disposed at an outer side and/or at an inner side of the metal laminated film. The resin films 31 may be made of polypropylene having excellent chemical resistance.

A getter 55 may be provided at the inner side of the envelope 20 in order to absorb a gas remaining at the inner side of the envelope 20 or a gas introduced into the interior of the envelope 20 from an outside. The getter 55 may be configured to include BaLi, CoO, BaO, CaO, and the like, in order to absorb oxygen, hydrogen, nitrogen, carbon dioxide, and vapor. Here, the getter 55 may be configured to have the shape of a certain block or a rectangular parallelepiped. Also, the getter 55 may be coated on an inner surface of the envelope or the surface of the core 70.

The core 70 for supporting the envelope 20 may be provided at the inner side of the envelope 20 in order to form and support a decompressed space having a certain vacuum degree.

The core 70 may be configured to include a plurality of unit cores 71 having the shape of a rectangular parallelepiped with an empty space formed therein. Accordingly, the use of glass fiber core can be avoided, and thus, a preprocessing process (e.g., hot pressing or needle punching, and the like), for which much equipment and much time are required, is not necessarily performed to reduce the size and volume of the glass fiber core resulting from the use of the glass fiber core.

In addition, because the deviation of the height (thickness) of the core 20 can be reduced, after the internal space of the envelope 20 is decompressed (vacuumized), a uniform insulation thickness of the vacuum insulation member 10a can be obtained. Namely, when the related art glass fiber core is used, after the internal space of the envelope 20 is decompressed (vacuumized), the thickness of the vacuum insulation member is greatly changed (about 30 percent), while there is little change in the thickness of the vacuum insulation member 10a according to the present exemplary embodiment, obtaining the uniform thickness.

In addition, because the envelope 20 is supported by the core 70 having the shape of a rectangular parallelepiped, after the interior of the envelope 20 is vacuumized, a generation of creases on the surface of the envelope 20 can be restrained. Accordingly, when the vacuum insulation member 10a is attached to an object (e.g., a wall surface of the main body of a refrigerator), a generation of a defective bonding that the vacuum insulation member 10a is detached from the object due to the creases of the envelope 20 can be prevented.

In addition, by appropriately adjusting the number of unit cores 71 or combining the unit cores 71, the size of the vacuum insulation member (panel), namely, the length, width, and thickness of the vacuum insulation member, can be adjusted. Accordingly, vacuum insulation members (panels) of various forms can be easily fabricated.

As shown in FIGS. 7 and 8, the unit core 71 may be configured to including a body 72 having a box-like shape (i.e., a rectangular container shape) with one side open and a cover 74 for opening and closing the opening of the body 42.

The unit core 71, specifically, the body 72 and the cover 74 may be made of a synthetic resin material. The body 72 and the cover 74 may be formed through injection molding. Here, the thickness of the body 72 and the cover 74 may range from 0.5 mm to 5 mm. However, the thickness is merely illustrative, and the thickness of the body 72 and the cover 74 may be appropriately adjusted in consideration of the thickness and the internal vacuum degree of the vacuum insulation member. The height of the core 70 may range from 5 mm to 15 mm such that it corresponds to the thickness of the vacuum insulation member.

Through portions 65 may be formed on the core 70 in order to restrain a heat transmission. In detail, the through portions 65 may be formed on a side wall of the body 42 in order to restrain a heat transmission in a thicknesswise (heightwise) direction. The through portions 65 may be configured as slits 67 each having a length which is long compared with its width. Through portions 67 may be configured to include a plurality of slits. The slits 67 may be formed such that certain regions thereof overlap with each other.

Here, as shown in FIG. 9, the core 70 may be configured to include a body 82 including a plurality of first body 83a and second body 83b separated in a thicknesswise (heightwise) direction. Accordingly, the height of the body 82, namely, the thickness of the vacuum insulation member 10b, can be easily adjusted. The first body 83a may be formed to have a blocked lower surface, and the second body 83b may be formed with upper and lower portions which are all open. A plurality of second bodies 83b may be configured. A cover 74 may be provided at an upper side of the second body 83b. Accordingly, the number of the second bodies 83b can be adjusted to adjust the thickness.

Meanwhile, an engagement part 85 may be formed at the body of each unit core 71. Accordingly, a generation of a slip between the two bodies which are in contact with each other can be restrained.

The engagement part 85 may be configured to include a protrusion 87 formed at one side of the body 72 and a receiving part 88 (or a receiving recess or a receiving hole) formed to be recessed to receive the protrusion 87. Here, the size, shape, and number of the protrusions 87 and receiving parts 88 can be appropriately adjusted.

Figure 10:
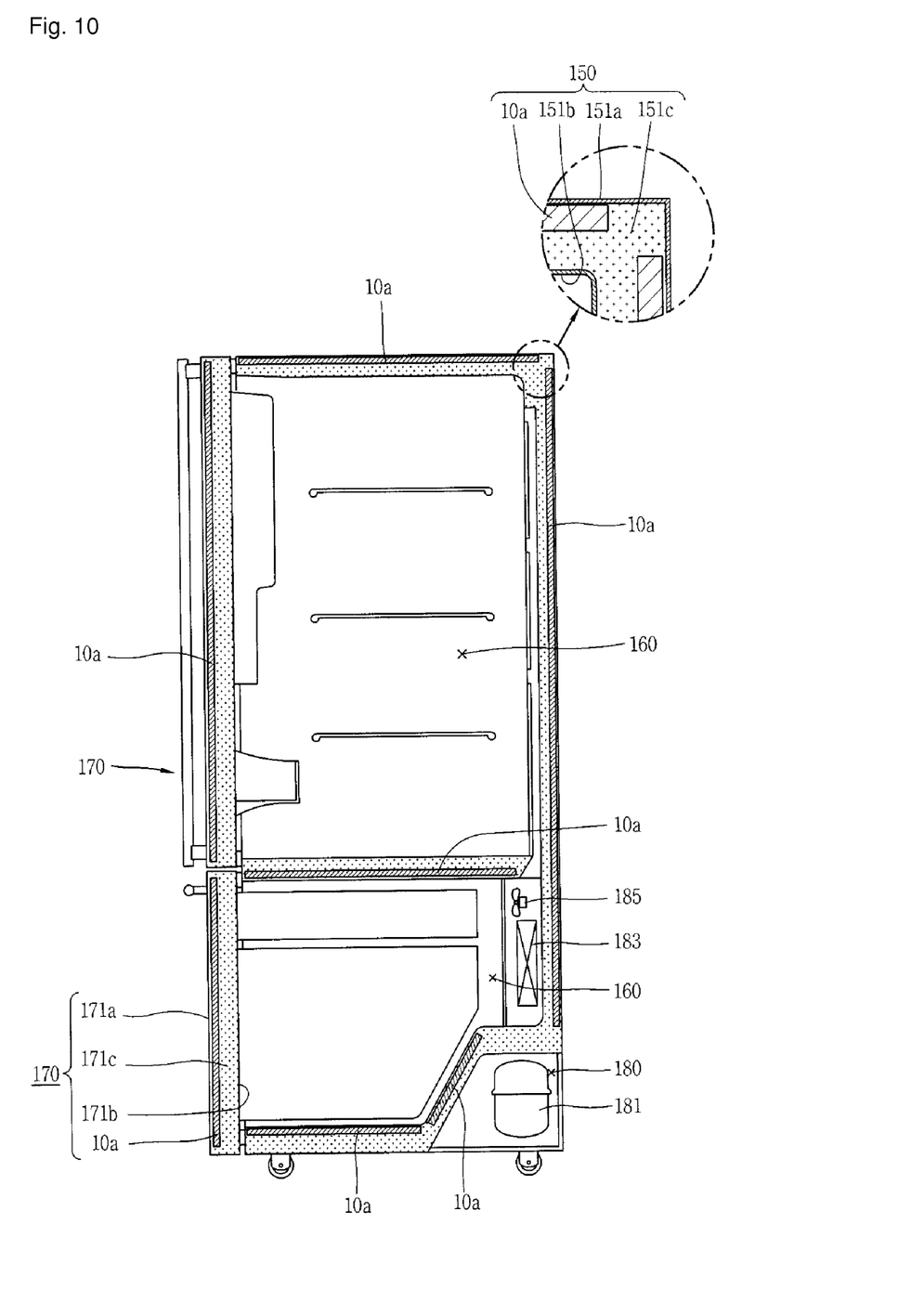
FIG. 10 is a sectional view of a refrigerator having a vacuum insulation member according to an exemplary embodiment of the present invention.

FIG. 10 is a sectional view of a refrigerator having a vacuum insulation member according to an exemplary embodiment of the present invention.

As shown in FIG. 10, a refrigerator having a vacuum insulation member may be configured to include a refrigerator main body 150 forming a cooling chamber therein, a door 170 for opening and closing the cooling chamber 160, and a vacuum insulation member 10a provided at the refrigerator main body 150 or the door 170. Here, the cooling chamber 160 is a general term for a freezing chamber and a refrigerating chamber, and the refrigerator main body 150 may be configured to include one of the freezing chamber and refrigerating chamber.

The vacuum insulation member 10a may be configured to include the envelope 20 having gas impermeability and having a certain decompressed space therein, and the core 40 having a certain shape, having an empty space formed therein, and disposed at an inner side of the envelope to support the envelope. Here, the vacuum insulation member 10a may be further include the getter 55 disposed at the inner side of the envelope 20 to absorb an internal gas. Here, the vacuum insulation member 10a may be configured to have the configuration of the vacuum insulation members 10a and 10b as described above with reference to FIGS. 1 to 9.

The refrigerator main body 150 includes an outer case 151a forming an external appearance and an inner case disposed to be spaced apart with a charging interval of an insulation member (foaming agent) 151c at an inner side of the outer case 151a and forming the cooling chamber 160 therein.

The refrigerator main body 150 may include a refrigerating cycle for providing cooling air to the cooling chamber 160. A mechanic chamber 180 may be formed at a lower region of a rear side of the refrigerator main body 150. The mechanic chamber 180 may include a partial configuration of the refrigerating cycle including a compressor 181, a condenser, and the like, and an evaporator 183 may be provided at one side of the interior of the cooling chamber 160. A cooling fan 185 may be provided at one side of the evaporator 183.

The vacuum insulation member 10a may be provided on at least one side wall of the refrigerator main body 150. Thus, the thickness of the corresponding side wall can be reduced, and accordingly, the internal space of the refrigerator can be increased as much with the same external appearance (size) maintained.

The door 170 may include an outer door plate 171a forming an external appearance and an inner door plate 171b spaced apart with a charging interval of the insulation member 171c from the outer door plate 171a at an inner side of the outer door plate 171a.

The door 170 may include the vacuum insulation member 10a. The vacuum insulation member 10a may be provided between the outer door plate 171a and the inner door plate 171b. Accordingly, the thickness of the door 170 can be reduced.

Here, because the vacuum insulation member 10a may be configured such that the envelope 20 is supported by the core formed as a structure having a certain shape, the vacuum insulation member 10a can have a uniform thickness. Thus, because the uniform vacuum insulation thickness is secured, the thickness of the side wall of the refrigerator can be reduced as much. Namely, in the related art vacuum insulation member, it has a large thickness deviation, so the thickness of the foaming agent is set based on the smallest portion of the thickness of the vacuum insulation member, causing a problem in that the thickness of the side wall of the cooling chamber 160 increases overall. In comparison, however, according to the present exemplary embodiment, the vacuum insulation member 10a has a uniform thickness, so the side wall of the cooling chamber 160 can be formed to be thinner overall, and thus, the internal space of the refrigerator can be increased as much.

In addition, because the vacuum insulation member 10a may be configured such that the envelope 20 is supported by the core 20 formed as a structure having the shape of a rectangular parallelepiped, a generation of creases on the surface of the envelope 20 can be restrained. Thus, when the vacuum insulation member 10a is bonded to an object, a defective bonding caused by a generated crease can be restrained.

In more detail, when the refrigerator main body 150 is fabricated, the vacuum insulation member 10a is disposed between the outer case 151a and the inner case 151b and fixed to one of the outer case 151a and the inner case 151b before a foaming operation of the refrigerator main body 150. When the vacuum insulation member 10a is fixed, the foaming agent (polyurethane, and the like) is injected between the outer case 151a and the inner case 151b.

The foaming agent injected into the interior between the outer case 151a and the inner case 151b expands while flowing within the internal space between the outer case 151a and the inner case 151b. In this case, because there is little creases on the surface of envelope of the vacuum insulation member 10a, vacuum insulation member 10a can be completely tightly attached to the surface of the object (e.g., the outer case 151a or the inner case 151b). Accordingly, the foaming agent is prevented from being introduced to between the vacuum insulation member 10a and the object, restraining a generation of a defective bonding that the vacuum insulation member 10a is detached from the object. In comparison, in the related art vacuum insulation member, because creases are generated on the envelope, when the vacuum insulation member is attached to the surface of the object (the outer case 151a or the inner case 151b), a gap due to the creases is generated between the vacuum insulation member and the object and the foaming agent will be introduced through the gap so as to be expanded, causing the defective attachment problem in that the vacuum insulation member is separated from the surface of the object.

In the exemplary embodiment illustrated and described above with reference to FIGS. 7 to 9, the body is divided in a vertical direction, but the body in the exemplary embodiment described above with reference to FIGS. 1 to 6 can be also configured to be divided in the vertical direction.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A vacuum insulation member comprising:
    an envelope having gas impermeability and having a certain decompressed space therein; and
    a core having a certain shape, having an empty space formed therein, and disposed at an inner side of the envelope to support the envelope,
    wherein the core comprises a body having at least one open side and a cover covering the open side of the body, and wherein the body has a box shape.

2. The vacuum insulation member of claim 1, wherein ribs are disposed in a thicknesswise direction at an inner side of the body.

3. The vacuum insulation member of claim 2, wherein the ribs are disposed to be perpendicular to each other.

4. The vacuum insulation member of claim 2, wherein the ribs are disposed to cross each other.

5. The vacuum insulation member of claim 1, wherein the core comprises a plurality of bodies and a plurality of covers.

6. The vacuum insulation member of claim 1, further comprising: a getter disposed at the inner side of the envelope and absorbing a gas.

7. The vacuum insulation member of claim 1, wherein a through portion is formed on the core to restrain a heat transmission.

8. The vacuum insulation member of claim 7, wherein the through portion comprises a slit having a length longer than its width.

9. The vacuum insulation member of claim 7, wherein the through portion is formed such that certain regions overlap with each other with respect to a thicknesswise direction.

10. The vacuum insulation member of claim 7, wherein an internal vacuum degree of the envelope ranges from $10^{-5}$ Torr to $10^{-2}$ Torr.

11. The vacuum insulation member of claim 10, wherein the envelope comprises a film main body and a metal laminated film including a laminated layer formed by laminating metal on an outer surface of the film main body.

12. A refrigerator comprising the vacuum insulation member of claim 1.

* * * * *